US011215902B2

(12) United States Patent
Kanas et al.

(10) Patent No.: US 11,215,902 B2
(45) Date of Patent: Jan. 4, 2022

(54) FERROMAGNETIC COVERS

(71) Applicant: HEWLETT-PACKARD DEVELOPMENT COMPANY, L.P., Houston, TX (US)

(72) Inventors: Derek Kanas, Houston, TX (US); Tony Moon, Houston, TX (US); Chan-Woo Park, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 650 days.

(21) Appl. No.: 16/076,107

(22) PCT Filed: Apr. 10, 2017

(86) PCT No.: PCT/US2017/026791
§ 371 (c)(1),
(2) Date: Aug. 7, 2018

(87) PCT Pub. No.: WO2018/190790
PCT Pub. Date: Oct. 18, 2018

(65) Prior Publication Data
US 2021/0200061 A1    Jul. 1, 2021

(51) Int. Cl.
*G03B 11/04* (2021.01)
*F16B 1/00* (2006.01)

(52) U.S. Cl.
CPC .............. *G03B 11/043* (2013.01); *F16B 1/00* (2013.01); *F16B 2001/0035* (2013.01)

(58) Field of Classification Search
CPC .................... G03B 11/043–045; F16B 1/00
See application file for complete search history.

(56) References Cited

U.S. PATENT DOCUMENTS

| D669,112 S | 10/2012 | Gustaveson |
| 9,465,276 B2 | 10/2016 | Jonsson et al. |
| 9,829,770 B1 * | 11/2017 | Gustaveson, II .... H04N 5/2257 |

(Continued)

FOREIGN PATENT DOCUMENTS

| CN | 205407975 U | 7/2016 |
| DE | 202011106305 U1 | 1/2012 |

(Continued)

OTHER PUBLICATIONS

Fitzpatrick, "How to Disable Your Webcam (and Why You Should)", Retrieved from Internet: https://www.howtogeek.com/210921/how-to-disable-your-webcam-and-why-you-should/, 2016, 8 Pages.

*Primary Examiner* — Minh Q Phan
(74) *Attorney, Agent, or Firm* — Brooks, Cameron & Huebsch PLLC

(57) ABSTRACT

Example implementations relate to ferromagnetic covers. For instance, in an example housing can include a bezel including first opening extending through a recess included in the bezel, a first magnet and a second magnet in an internal volume of the housing, and a ferromagnetic cover disposed in the recess and magnetically coupled to the first magnet and the second magnet, where the ferromagnetic cover includes a second opening to obscure a viewing portion of the first opening with the continuous portion when the ferromagnetic cover is positioned adjacent to a first side surface of the recess.

14 Claims, 5 Drawing Sheets

(56) References Cited

U.S. PATENT DOCUMENTS

| | | | |
|---|---|---|---|
| 2006/0184039 A1* | 8/2006 | Avni | ................... H04N 5/3696 600/476 |
| 2011/0115924 A1 | 5/2011 | Yu et al. | |
| 2011/0182029 A1 | 7/2011 | Wu et al. | |
| 2014/0016031 A1 | 1/2014 | Tsai et al. | |
| 2015/0009399 A1 | 1/2015 | Jonsson et al. | |
| 2016/0161830 A1 | 6/2016 | Gonzalez Sanchez | |

FOREIGN PATENT DOCUMENTS

| | | |
|---|---|---|
| EP | 2787411 A2 | 10/2014 |
| WO | 2015091470 A1 | 6/2015 |

* cited by examiner

FERROMAGNETIC COVERS

BACKGROUND

Computing systems such a laptop computers, desktop computers, various phones such as mobile phones, etc. may include a camera. The camera may capture electronic images such as photos and/or video images. The camera may capture the electronic images responsive to an input such as an input provided by a user and/or an application, among other possibilities. The cameras may be located on an external surface of the computing system to promote capture of the electronic images.

DETAILED DESCRIPTION

Privacy is a concern for users of electronic devices such as laptops, cellular phones and other electronic devices including cameras. For instance, some nefarious entities may seek to gain control of a camera in an electronic device for a variety of undesired reasons. For instance, a nefarious entity may through various mechanisms acquire control of a camera included in an electronic device and/or gain access to electronic images captured by a camera included in an electronic device unbeknownst to a user of the electronic device. In some approaches, this may be possible because the camera may be visible and accessible to the user at all times during operation of the computing device. For example, in some approaches the camera may be mounted on an exterior portion of a computing device (e.g., on a display of the computing device) where it may be visible and accessible to the user during operation of the computing device.

Accordingly, the disclosure is directed to ferromagnetic covers. For example, a housing can include a bezel including first opening extending through a recess included in the bezel, a first magnet and a second magnet in an internal volume of the housing, and a ferromagnetic cover disposed in the recess and magnetically coupled to the first magnet and the second magnet, where the ferromagnetic cover includes a second opening to obscure a viewing portion of the first opening with the continuous portion when the ferromagnetic cover is positioned adjacent to a first side surface of the recess.

As detailed herein, ferromagnetic covers can obscure a viewing portion of a first opening and/or a lens of a camera in an electronic device. For example, ferromagnetic covers can to mitigate and/or eliminate a nefarious entities ability to utilize a camera of an electronic device in an undesired manner. Additionally, ferromagnetic covers can desirably promote a thinner bezel as compared to other approaches that may utilize a thicker bezel due to the presence of a mechanical fastener such as a tongue and groove fastener included at least in part (e.g., a groove) in the bezel.

Figure 1:
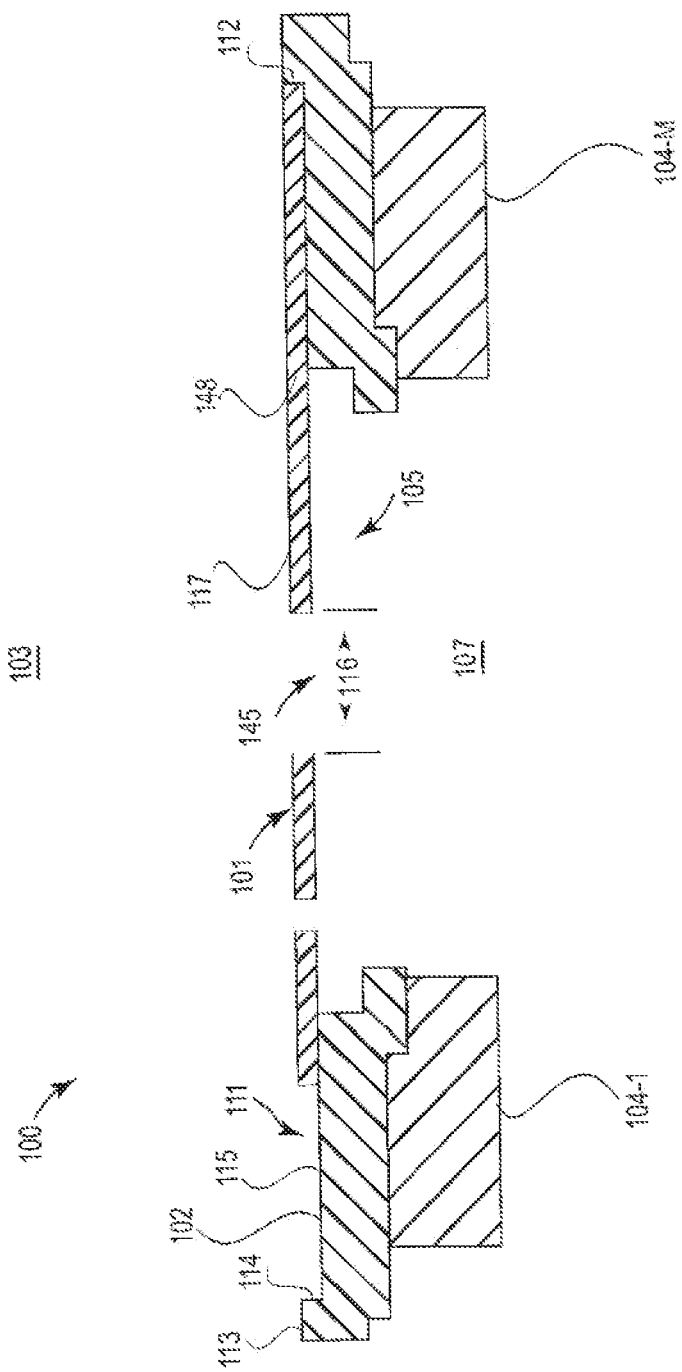
FIG. 1 illustrates a section view of a portion of an example diagram of a housing including a ferromagnetic cover according to the disclosure.
Figure 3:
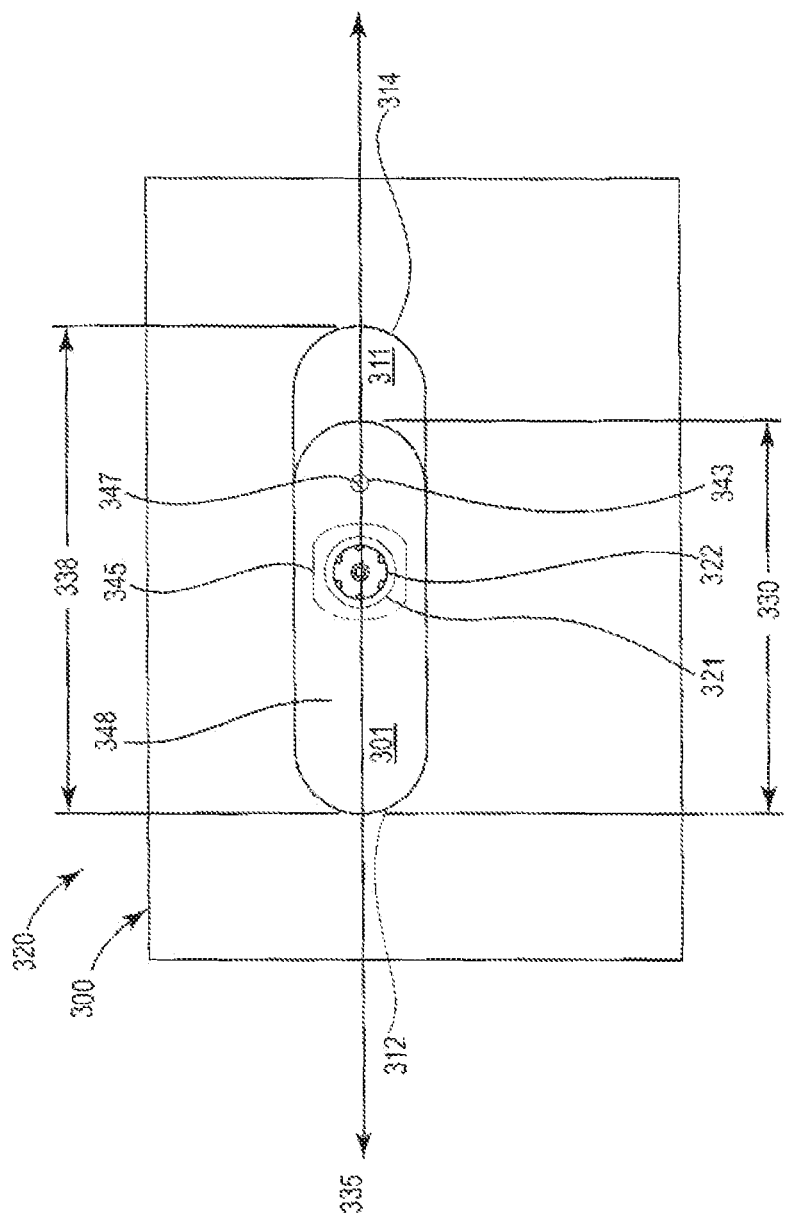
FIG. 3 illustrates a side view of a portion of an example diagram of an electronic device including a ferromagnetic cover according to the disclosure.

FIG. 1 illustrates a section view (taken along plane 335 as illustrated in FIG. 3) of a portion of an example diagram of a housing 100 including a ferromagnetic cover 101 according to the disclosure. As illustrated in FIG. 1 the housing 100 can include the ferromagnetic cover 101, a bezel 102, a first magnet 104-1 and a second magnet 104-M in an internal volume 107 of the housing 100.

The housing 100 can form an exterior surface of an electronic device such as those described herein. In various examples, the housing 100 and/or the bezel 102 can form an internal volume 107. The internal volume 107 can be sized to receive a camera and/or various other electrical/mechanical components that may be included in an electronic device. That is, in various examples, the housing 100 can include additional components such as a camera, computing resource, and/or processing resource, among other types of components.

The housing 100 can be formed of fabric, metal, and/or plastic, among other suitable material to promote ferromagnetic covers. For example, the housing 100 can be formed of a plastic and/or fabric mat, among other possibilities.

The ferromagnetic cover 101 can be formed of various materials including materials such as iron that are attracted to magnets such as the magnets 104-1 and 104-M. For instance, the ferromagnetic cover 101 can include ferromagnetic materials in a quantity to magnetically couple the ferromagnetic cover 101 to the first magnet 104-1 and/or the second magnet 104-M, among other possibilities. As illustrated in FIG. 1, the ferromagnetic cover 101 and the side surfaces 112 and 114 can be substantially planar mechanical connectionless surfaces.

As used herein, the term "substantially" intends that the characteristic needs not be absolute, but is close enough so as to achieve the advantages of the characteristic. For example, "substantially parallel" is not limited to absolute parallelism, and can include orientations that are intended to be parallel but due to manufacturing limitations may not be precisely parallel. For example, "substantially parallel" or "substantially planar" features are at least closer to a parallel orientation than a perpendicular orientation, and generally are formed within a few degrees of parallel. Similarly. "substantially perpendicular" is not limited to absolute perpendicularity, and can include orientations that are intended to be parallel but due to manufacturing limitations may not be precisely perpendicular. For example, "substantially perpendicular" features are at least closer to a perpendicular orientation than a parallel orientation (e.g., within a few degrees of perpendicular).

As illustrated in FIG. 1 each of the ferromagnetic cover 101, the first side surface 112, and the second side surface 114 are mechanically connectionless planar surfaces. Similarly, as lustrated in FIG. 1, each surface of the ferromagnetic cover can comprise a mechanical connectionless planar surface.

As mentioned, the ferromagnetic cover 101 can be substantially planar. However, the disclosure is not so limited. Rather, in some examples, the ferromagnetic cover 101 and/or the bezel 102 can be curved or have a non-zero angle change, for instance an angle between 1 degree and 60 degrees, among other possibilities, across a portion of a width, thickness, or height of the ferromagnetic cover 101 and/or the bezel 102.

Figure 2:
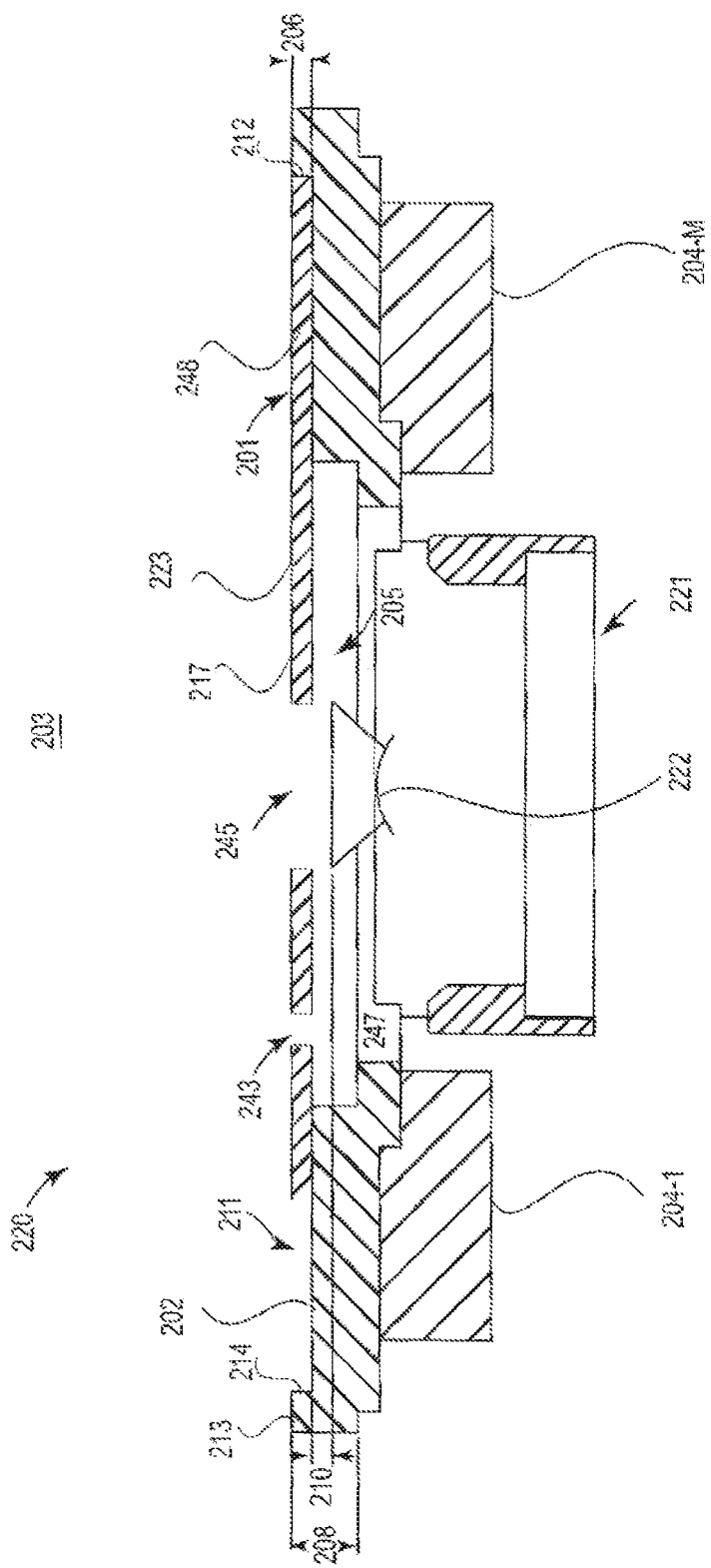
FIG. 2 illustrates a section view of a portion of an example diagram of an electronic device including a ferromagnetic cover according to the disclosure.

The ferromagnetic cover 101 can include a second opening 145 and a continuous portion 148. The second opening 145 passes entirely through the ferromagnetic cover 101. The second opening 145 can permit selectively obscuring of a viewing portion 116 of the first opening 105, as described herein. The viewing portion 116 refers to a portion of the first opening sized to receive an electronic image capture and/or electronic image projection element such as a lens (e.g., lens 222 as illustrated in FIG. 2) and that aligns with the second opening 145 to permit the lens or other element to view the environment 103 via the viewing portion 116 and the second opening 145 when the ferromagnetic cover 101 is positioned adjacent to the first side surface 112 of the recess 111.

Wile FIG. 1 illustrates the viewing portion 118 as unobscured, the viewing portion can be obscured by the continuous portion 148 when the ferromagnetic cover 101 is positioned adjacent to a second side surface 114 of the recess 111, as described herein. The continuous portion 148 refers to a portion of the ferromagnetic cover 101 that does not allow visible light (to an unaided human eye) to pass from the environment 103 surrounding the housing 100 to the internal volume 107 of the housing 100.

The bezel 102 refers to a component that surrounds a display of an electronic device. For instance, the bezel 102 can surrounds a periphery of an electronic display included in an electronic device such as a laptop or mobile phone, among other types of electronic device including those described herein.

The bezel 102 can be formed of a same or different material than a material forming other portions of the housing 100. For instance, the bezel can be formed of fabric, metal, and/or plastic, among other suitable materiel to promote ferromagnetic covers.

As illustrated in FIG. 1, the bezel 102 can include a first opening 105 defined by the bezel 102 and extending from an environment 103 surrounding the housing 100 through the bezel 102 into an internal volume 107 of the housing 100. The first opening 105 can be sized to permit a camera in electronic device included in the internal volume 107 of the housing 100 to capture electronic images via the first opening 105 when the camera is exposed to the environment surrounding the housing 100. That is, as described herein the first opening 105 can be selectively exposed by actuation of the ferromagnetic cover to a first position and/or a second position within a recess 111.

Recess 111 refers to a portion of bezel 102 having an inner surface 115 that is recessed or closer to the internal volume 107 relative to outer surface 113 of the bezel 102. As mentioned, the recess can be sized to include the ferromagnetic cover 101 at least partially within the recess. For instance, is illustrated in FIG. 1 the ferromagnetic cover can be recessed within recess 111 such that an outer surface 117 of the ferromagnetic cover 101 is coplanar with the outer surface 113 of the bezel when the ferromagnetic cover is disposed in the recess 111.

As used herein, "disposed" means a location at which something is physically positioned. As detailed herein, having the surface 117 of the ferromagnetic cover 101 coplanar with the outer surface 113 of the bezel can promote a thinner bezel 102 as compared to bezels that employ a mechanical fastener in a bezel and/or a cover to fasten a cover to a bezel and/or those approaches that employ an integral shutter in the camera.

The first magnet 104-1 and the second magnet 104-M can refer to components including magnetic materials to magnetically couple to the ferromagnetic cover 101. As used herein, a magnetic coupling refers to a coupling between a ferromagnetic cover and magnet established due to a magnetic force (e.g., attractive force) established between the ferromagnetic cover and the magnet to maintain the ferromagnetic cover in a recess included in a housing. That is, other approaches may rely on a mechanical fastening mechanism such as a tongue and groove and therefore have a resultant bezel thickness greater than a thickness of the bezel 102, as described herein, which relies on magnetic coupling to maintain the ferromagnetic cover 101 in the recess 111. In various examples, the first magnet 104-1 and the second magnet 104-M can be permanent magnets. While FIG. 1 refers to magnet 104-1 as the first magnet and magnet 104-M as the second magnet it is understood that in various examples the magnet 104-M or another magnet can be a first magnet while magnet 104-1 or another magnet can be a second magnet.

While FIG. 1 illustrates the housing as including a total of two magnets the disclosure is not so limited. Rather, the disclosure can include fewer or more total magnets. For instance, in some examples the housing 100 can include a total of four magnets. In such examples, the magnets can include two magnets on a first side of the first opening 105 and two magnets on a second side opposite the first side of the opening 105, among other possibilities. Having a plurality of magnets on each side of the opening can, in some examples, promote magnetically coupling the ferromagnetic cover 101 to the magnets and/or promote selectively exposing/obscuring the first opening 105 in a desired manner.

FIG. 2 illustrates a section view (taken along plane 335 as illustrated in FIG. 3) of a portion of an example diagram of an electronic device 220 including a ferromagnetic cover according to the disclosure. As illustrated in FIG. 2, the electronic device 220 can include a ferromagnetic cover 201, a bezel 202, magnets such as a first magnet 204-1 and a second magnet 204-M, a camera 221, and an indicator 247, among other components. Examples of the electronic device 220 include laptop computers, desktop computers, tablets, mobile phones, and various other electronic devices suitable with ferromagnetic covers.

The camera 221 refers to a deice to capture electronic images such as photographs and/or video images. The camera 221 may include a charge coupled device (CCD), complementary metal-oxide semiconductor (CMOS) sensor, an infrared sensor, a lens, and/or various circuitry to cause operation of the camera 221. In some examples, the camera 221 may be operable as a projector to project electronic images and/or video to a wall or screen physically separate from the electronic device 220. In some examples, the camera 221 can be an infrared camera to capture images in the infrared spectrum of light such as infrared images suitable for facial recognition. The lens 222 of the camera can be disposed in a viewing portion (not shown in FIG. 2 for ease of illustration) of the first opening 205 to permit the camera to capture electronic images when the ferromagnetic cover 201 is positioned adjacent to a first side surface 212 and to obscure the lens 222 when the ferromagnetic cover 201 is positioned adjacent to a second side surface 214.

The lens 222 can be recessed a distance 210 from the ferromagnetic cover 201 to protect the lens from contacting the ferromagnetic cover 201. The lens can 222 can be included in a cap (not shown for ease of illustration) or other housing element of the camera 221 that may contact the ferromagnetic cover 201 when the lens is recessed in the cap and disposed the distance from the ferromagnetic cover. The lens 222 can be a fixed lens or can be a telescoping lens or other type of mechanically adjustable lens, however, in any case lens is maintained at least the distance 210 from the ferromagnetic cover 210.

The lens 222 can be included in a shutterless camera. As used herein, the term "shutterless" refers to an electronic camera that is without an integral shutter included in the camera to cover the lens. As mentioned, in contrast to approaches that rely on cameras including a shutter, the disclosure relates to thinner electronic devices including a ferromagnetic cover and that is not susceptible to attacks by nefarious entities that may seek to gain control of a shutter employed in other approaches.

The camera 221 may be made from synthetic, semi-synthetic, or organic compounds, or combinations thereof. For example, the camera 221 may be made from polymers, plastics (e.g., thermoplastics), metals, etc. In some examples, the camera 221 may be painted or dyed to match or contrast with a color associated with the electronic device 220. For instance, a portion of the camera surrounding, lens 222 of the camera 221 can be a different color that contrasts with a color of the electronic device to provide an indication to a user of the electronic device 220 that the camera (e.g., a lens of the camera) is exposed to environment.

In various examples, the bezel 202 can have a uniform thickness 208 along an entirety of a perimeter of the bezel. That is, at all locations other than at the first opening 205 a thickness 208 along the bezel 202 can be uniform. For instance, as illustrated in FIG. 2, the bezel can maintain a uniform thickness 206 even at a recess 211 in the bezel 211. In some examples, the bezel 202 can have a thickness from 500 to 1200 microns. AN subranges and values from 500 to 1200 microns are included.

The thickness 206 of the ferromagnetic cover 201 can be equal to a depth of the recess 211 such that the top surface 217 of the ferromagnetic cover is substantially coplanar with the outer surface 213 of the bezel 202. In some examples, the ferromagnetic cover 201 can have a thickness from 50 to 500 microns. All subranges and values from 50 to 500 microns are included.

The third opening 243 passes entirely through the ferromagnetic cover 201 to expose the indicator 247 when the ferromagnetic cover 201 is positioned adjacent to the first side surface 212 of the recess 211. The continuous portion 248 can obscure the indicator 247 when the ferromagnetic cover 201 is positioned adjacent to the second side surface 214 of the recess 211.

In this manner, indicator can indicate the camera 222 is exposed to the environment 203 when the ferromagnetic cover 201 is positioned adjacent to the first side surface 212 of the recess 211 and indicate the camera 221 is obscured when the ferromagnetic cover 201 is positioned adjacent to the second side surface 214 of the recess 211. Alternatively. or in addition, visual indicator 247 can indicate that the camera is powered on/off, for instance, by turning the visual indicator in/off, changing an intensity of alight emitted by the visual indicator, changing a color of light emitted by the visual indicatory, among other possibilities.

Indicator 247 refers to any suitable visual indicator including powered visual indicators and unpowered visual indicators. Examples of powered visual indicators include various powered light sources such as light emitting diodes. Powered visual indicators can provide an indication by way of turning on/off, changing an intensity of light emitted, and/or changing a color of light emitted, among other possibilities. Examples of nonpowered visual indicators included mirrors, symbols, numeric characters, alphabetic characters, alpha-numerical characters, among other possible nonpowered visual indicators.

While FIG. 2, lustrates the electronic device 220 as including visual indicator 247 it is understood that the electronic device can include additional visual indicators or may be without a visual indicator. For instance, in some examples, visual indicator 247 can be a power visual indicator while the electronic device can include a nonpowered visual indicator at a different location than visual indicator 247, among other possibilities.

In some examples, the third opening 243 can have diameter less than a diameter of the second opening 245, as illustrated in FIG. 1. While FIGS. 1, 2 and 3 illustrate a third opening in the ferromagnetic cover it is understood that the disclosure is not so limited. For instance, in various examples, the ferromagnetic cover can include a continuous portion and a second opening but be without a third opening. In some examples, the third opening 243 can be adjacent to the visual indicator 247 when the ferromagnetic cover is positioned adjacent to the first side surface, as illustrated in FIG. 2.

FIG. 3 illustrates a side view of a portion of an example diagram of an electronic device 320 including a ferromagnetic cover 301 according to the disclosure. As illustrated in FIG. 3, the electronic device can include a housing 300, a visual indicator 347, a camera 321 including a lens 322, and the ferromagnetic cover 301 including a continuous portion 348, a second opening 345, and a third opening 343.

Ferromagnetic cover 301 can expose a viewing portion of the first opening when the ferromagnetic cover 301 is positioned adjacent to a first side surface 312 of the recess 311 as illustrated in FIG. 3 by the lens 322 of being visible in the second opening 345. Stated differently, the second opening 345 can expose the lens 322 when the ferromagnetic cover 301 is positioned adjacent to the first side surface 312 of the recess 311.

As illustrated in FIG. 3, the ferromagnetic cover 301 can have a total length 330 that is less than a corresponding total length 338 of the recess 311. As such, the ferromagnetic cover 301 can be positioned adjacent to the first side surface 312 or positioned adjacent to the second side surface 314. The first side surface 312 and the second side surface 314 are disposed along a common plane. For instance, as lustrated in FIG. 3 the first side surface 312 and the second side surface 314 can be disposed along a substantially horizontal plane 335 extending in a direction along the length (equal to distance 338) of the recess 311.

Figure 4:
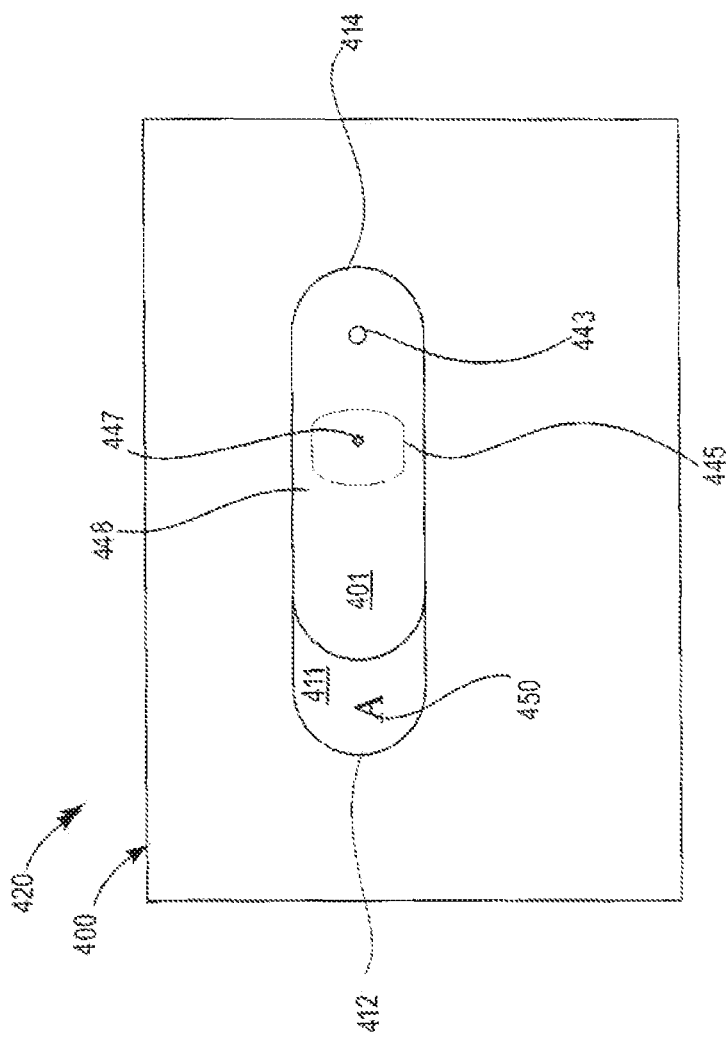
FIG. 4 illustrates a side view of a portion of an example diagram of an electronic device including a ferromagnetic cover according to the disclosure.

FIG. 4 lustrates a side view of a portion of an example diagram of an electronic device 420 including a ferromagnetic cover 401 according to the disclosure. As illustrated in FIG. 4, the electronic device 420 can include a housing 400 and a visual indicator 447. Notably, the visual indicator 447 is visible via the second opening 447 while in FIG. 3 the visual indicator is visible through the third opening.

As illustrated in FIG. 4, the ferromagnetic cover 401 can include a second opening 445 and a third opening 443. Ferromagnetic cover 301 can include a continuous portion 448 to obscure a viewing portion of the first opening when the ferromagnetic cover 401 is positioned adjacent to the second side surface 414 of the recess 411 as illustrated in FIG. 4 by the lens of the camera not being visible in the second opening 445. Stated differently, the continuous portion 448 can obscure the lens when the ferromagnetic cover 401 is positioned adjacent to the second side surface 414 of the recess 411. It is understood that although 412 refers to the first side surface it can, in some examples comprises the second side surface while 414 comprises the first side surface. More generally, as used herein, the second side surface can be positioned at an opposite end of a recess from the first side surface.

As illustrated in FIG. 4, the housing 400 can include a nonpowered visual indicator illustrated as "A" 450. As mentioned, the nonpowered visual can provide an additional visual indication of a relative position of the ferromagnetic cover, for instance, indicate when the ferromagnetic cover is obscuring the lens as illustrated in FIG. 4, among other possibilities. While illustrated at the location of element 450 it is understood that the nonpowered visual indicator could be at a different location such as deposed in the recess at a location that is visible via the second opening and/or the third opening when the ferromagnetic cover is positioned (e.g., at a second side of the recess) to obscure the lens. In this manner, such nonpowered visual indicator can be revealed when the lens is obscured by itself obscured (by the continuous portion) when the ferromagnetic cover 401 is positioned to expose the lens.

Figure 5:
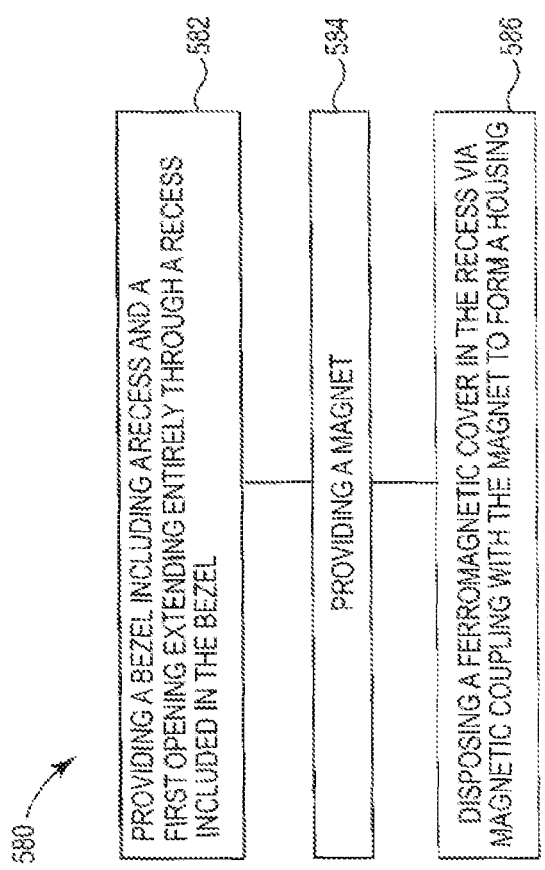
FIG. 5 illustrates a flow diagram of an example of a method according to the disclosure.

FIG. 5 illustrates a low diagram of an example of a method 580 according to the disclosure. As illustrated in FIG. 5 at 582, the method 580 can include providing a bezel including a first opening extending entirely through the bezel. As used herein, the term "providing" refers to manufacture or procurement of an unassembled component intended for assembly into a larger system including a plurality of components such as an electronic device including those described herein.

As illustrated in FIG. 5 at 584, the method 580 can include providing a magnet such as a first magnet and/or providing a second magnet. It is noted that the magnet such as the first magnet and/or the second magnet described herein is separate and distinct from the ferromagnetic cover. That is, even when magnetically coupled together the magnet is not is direct contact with the ferromagnetic cover.

The method 580 can include disposing a ferromagnetic cover in the recess via magnetic coupling with the magnet to form a housing including the ferromagnetic cover, as illustrated at 586. Disposing can positioning the ferromagnetic cover in proximity of the magnet to permit magnetic coupling between the ferromagnetic cover and the magnet. In some examples, the method can further comprise disposing be ferromagnetic cover in the recess solely via magnetic coupling with the magnet and not with a separate or additional mechanical fastener such as a tongue and groove fastener.

In some examples, the method 580 can further include positioning the ferromagnetic cover adjacent to a first side surface of the recess or positioning the ferromagnetic cover adjacent to a second side surface of the recess. Such positioning can be performed via manual manipulation of the ferromagnetic cover (e.g., by a user) among other possibilities.

It will be understood that when an element is referred to as being "on" "connected to" "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples (e.g., having different thickness) may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 101 may refer to element 101 in FIG. 1 and an analogous element may be identified by reference numeral 301 in FIG. 3. Elements shown in the various figures herein can be added, exchanged, and/or eliminated so as to provide additional examples of the disclosure in addition, the proportion and the relative scale of the elements provided in the figures are intended to illustrate the examples of the disclosure and should not be taken in a limiting sense.

What is claimed:

1. A housing comprising:
a bezel including first opening extending through a recess included in an outer surface of the bezel;
a first magnet and a second magnet in an internal volume of the housing;
a ferromagnetic cover disposed in the recess and coupled to the bezel solely via a magnetic coupling to the first magnet and the second magnet, wherein the ferromagnetic cover includes a second opening to expose a viewing portion of the first opening and a third opening, wherein an entirety of an outer surface of the ferromagnetic cover is co-planar with the outer surface of the bezel; and
a visual indicator disposed in the recess at a location that is visible via the third opening when the ferromagnetic cover is adjacent to a side surface of the recess.

2. The housing of claim 1, wherein each surface of the ferromagnetic cover comprises a mechanical connectionless surface.

3. The housing of claim 1, wherein the ferromagnetic cover has a total length that is less than a corresponding total length of the recess.

4. The housing of claim 1, wherein the first magnet is positioned on a first side of the first opening and the second magnet is positioned on a second side of the first opening that is opposite the first side of the first opening.

5. The housing of claim 4, wherein the first side of the first opening and the second side of the first opening are disposed along a substantially horizontal plane extending along the length of the recess.

6. The housing of claim 4, wherein the housing further comprises a third magnet positioned on the first side of the first opening and a fourth magnet positioned on the second side of the first opening.

7. The housing of claim 1, wherein the bezel has a uniform thickness along an entirety of a perimeter of the bezel.

8. The housing of claim 1, wherein the ferromagnetic cover has a thickness from 50 to 500 microns, and wherein the bezel has a thickness from 500 to 1200 microns.

9. The housing of claim 1, wherein the ferromagnetic cover further comprises a continuous portion to obscure the viewing portion when the ferromagnetic cover is positioned adjacent to the side surface of the recess.

10. An electronic device comprising:
a camera including a lens; and
a housing including:
a bezel including defining a portion of an internal volume of the housing and including a first opening extending through a recess included in an outer surface of the bezel;

a first magnet and a second magnet in the internal volume of the housing; and a visual indicator;

a ferromagnetic cover coupled to the bezel solely via a magnetic coupling to the first magnet and the second magnet, the ferromagnetic cover including: a second opening to expose the lens when the ferromagnetic cover is positioned adjacent to a side surface of the recess; and a continuous portion to obscure the lens, wherein an entirety of an outer surface of the ferromagnetic cover is co-planar with the outer surface of the bezel, and wherein the lens is recessed a distance from the ferromagnetic cover protect the lens from contacting the ferromagnetic cover; and a third opening, wherein the visual indicator is visible via the third opening when the ferromagnetic cover is positioned at the side of the recess.

11. The electronic device of claim 10, wherein the camera is a shutterless camera.

12. The electronic device of claim 10, wherein the visual indicator further comprises a nonpowered visual indicator.

13. The electronic device of claim 12, wherein the nonpowered visual indicator is located in the recess.

14. The electronic device of claim 13, wherein the nonpowered visual indicator is located in the recess at a location that is visible via the third opening in the ferromagnetic cover when the ferromagnetic cover is positioned at the side of the recess.

* * * * *